(12) United States Patent
Kaminski et al.

(10) Patent No.: US 6,495,942 B1
(45) Date of Patent: Dec. 17, 2002

(54) NON-METALLIC STRUCTURAL ROTOR ENCLOSURE

(75) Inventors: Christopher A. Kaminski, Schenectady, NY (US); Richard J. Keck, Schenectady, NY (US); Yu Wang, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/491,504

(22) Filed: Jan. 26, 2000

(51) Int. Cl.[7] .............. H02K 5/00; H02K 3/48; H02K 1/22
(52) U.S. Cl. .............. 310/262; 310/264; 310/271; 310/214; 310/89
(58) Field of Search .............. 310/89, 262, 85, 310/261, 45, 211, 264, 271, 214

(56) References Cited

U.S. PATENT DOCUMENTS

| | | | | |
|---|---|---|---|---|
| 3,189,769 A | * | 6/1965 | Willyoung | 310/52 |
| 3,956,648 A | * | 5/1976 | Kirtley, Jr. et al. | 310/40 R |
| 4,091,301 A | * | 5/1978 | Blank | 310/270 |
| 4,146,809 A | * | 3/1979 | Rielly | 310/261 |
| 4,358,700 A | * | 11/1982 | Nottingham et al. | 310/262 |
| 5,168,186 A | * | 12/1992 | Yashiro | 310/47 |

* cited by examiner

Primary Examiner—Nestor Ramirez
Assistant Examiner—Guillermo Perez
(74) Attorney, Agent, or Firm—Nixon & Vanderhye P.C.

(57) ABSTRACT

A non-metallic structural enclosure for a generator rotor replaces conventional containment components including rotor wedges, rotor teeth and retaining rings. The enclosure includes a non-metallic tube formed of a plurality of spaced rings or of a continuous tube including ventilation holes or slots. The simplified rotor assembly serves to restrain the winding against centrifugal forces with a more highly optimized use of space and materials. The arrangement allows more space for copper and ventilation, thereby benefiting both efficiency and the performance of the machine. The use of individual rings has the additional benefit of providing restraint against centrifugal forces without reducing the effectiveness of cross slots in the rotor body from correcting peripheral dissymmetries in rotor stiffness. The rings also provide openings for ventilation without introducing stress concentrations in the enclosure.

15 Claims, 3 Drawing Sheets

NON-METALLIC STRUCTURAL ROTOR ENCLOSURE

BACKGROUND OF THE INVENTION

The present invention relates to generators and, more particularly, to an enclosure for a generator rotor.

In a conventional generator having a rotor and a stator, the rotor is provided with field windings that excite the generator while receiving a current from an exciting current source. The stator is provided with armature windings from which electrical power is output. Typical rotor construction requires that a field winding be assembled bar by bar, into radial slots milled into a rotor forging. Containment of the rotor field windings is typically achieved using rotor wedges, rotor teeth and retaining rings.

It would be desirable to replace the bar by bar assembly with a solid rotor having parallel slots milled into a rotor forging. With this structure, the containment components could be replaced with a simplified enclosure.

BRIEF SUMMARY OF THE INVENTION

In an exemplary embodiment of the invention, an enclosure for a rotor in a generator including the rotor and a stator is comprised of a non-metallic tube. The tube may be formed of a plurality of rings that are spaced at predetermined intervals or of a continuous tube including ventilation holes therein. The rings are spaced axially such that cross slots in the rotor lie between the rings. These cross slots provide corrections to dissymmetry in rotor stiffness around a periphery of the rotor. The spaces between adjacent rings provide discharge openings for winding ventilation without introducing stress concentrations in the enclosure. Preferably, the non-metallic tube is formed of a low density composite material, such as a carbon fiber—glass fiber epoxy composite.

In another exemplary embodiment of the invention, a rotor in a generator includes a magnetic core having at least two poles, a plurality of winding assemblies, one for each pole, and an enclosure housing the core and the winding assemblies, wherein the enclosure is comprised of a non-metallic tube.

DETAILED DESCRIPTION OF THE INVENTION

Figure 1:
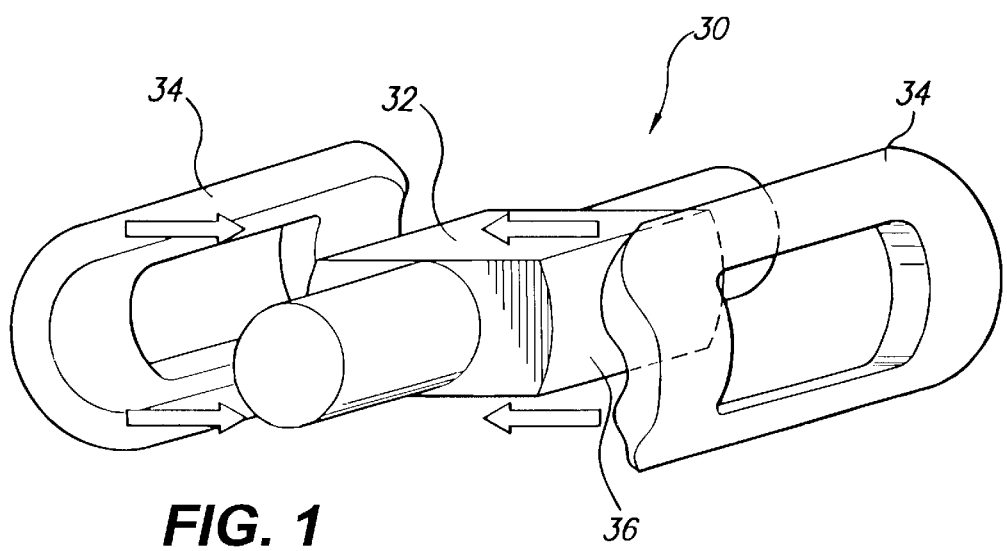
FIG. 1 is a winding assembly drawing of a generator rotor.
Figure 2:
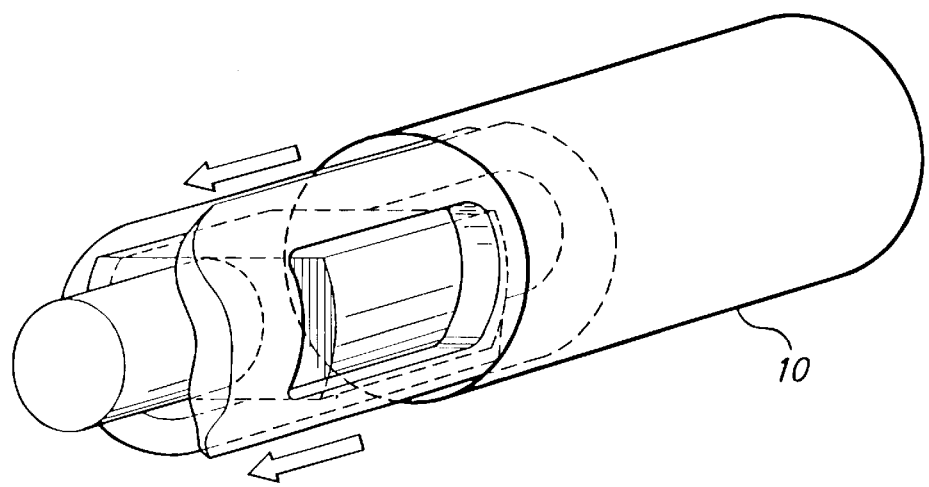
FIG. 2 is an assembly drawing of a generator rotor including the enclosure of the present invention.

With reference to FIGS. 1 and 2, a generator rotor 30 includes a multi-pole magnetic core 32 (two-pole core shown) and a plurality of winding assemblies 34, one for each pole, and corresponding pole faces 36. The construction and materials of the magnetic core 32 and winding assemblies 34 are known, and details thereof will not be further provided.

After the winding assemblies 34 are slid over the parallel sided forging of the two-pole magnetic core 32, an enclosure 10 is slid over the assembly. The enclosure 10 is preferably constructed from a low density composite material, such as a carbon fiber—glass fiber composite, and is configured to provide a means for discharging winding ventilation gas to a generator air gap 12 (see FIGS. 3 and 4). The composite material is preferred because of its high strength to weight ratio. Other materials may also be suitable as would be apparent to those of ordinary skill in the art, and the invention is not meant to be particularly limited to the disclosed example.

In one arrangement, the enclosure 10 is a tube defined by a plurality of rings 14 that are spaced by shallow grooves 37 in the pole faces 36. The rings 14 are spaced axially such that cross slots 38 in the rotor body lie between the rings 14 as shown. These cross slots 38 provide corrections to dissymmetry in rotor stiffness around the periphery of the machine. In an alternative arrangement, the enclosure 10 is a continuous tube including a plurality of ventilation holes or slots 16 (noted with a dashed line in FIG. 4). The ventilation holes 16 or spaces between the rings 14 in the embodiment noted above provide discharge openings for winding ventilation without introducing stress concentrations in the enclosure.

The low density, composite material enclosure may be formed by various known methods. In a preferred embodiment, the material is wound around a mandrel into a desired construction. The ventilation holes or slots may be formed during the winding process via the mandrel or may alternatively be formed with a drill or laser or other post-winding method.

Figure 3:
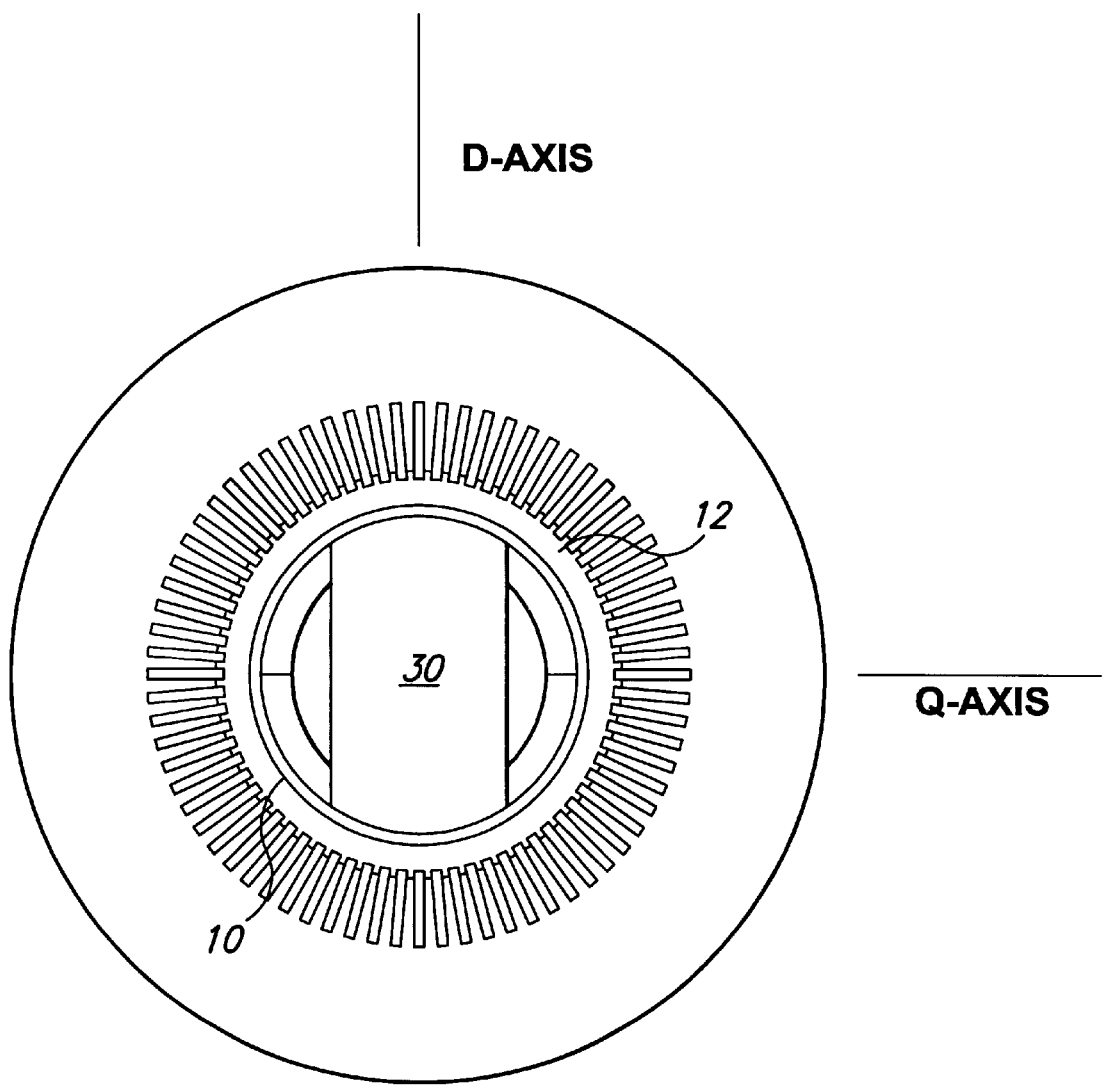
FIG. 3 is a schematic illustration of a generator rotor and stator and the enclosure of the present invention.
Figure 4:
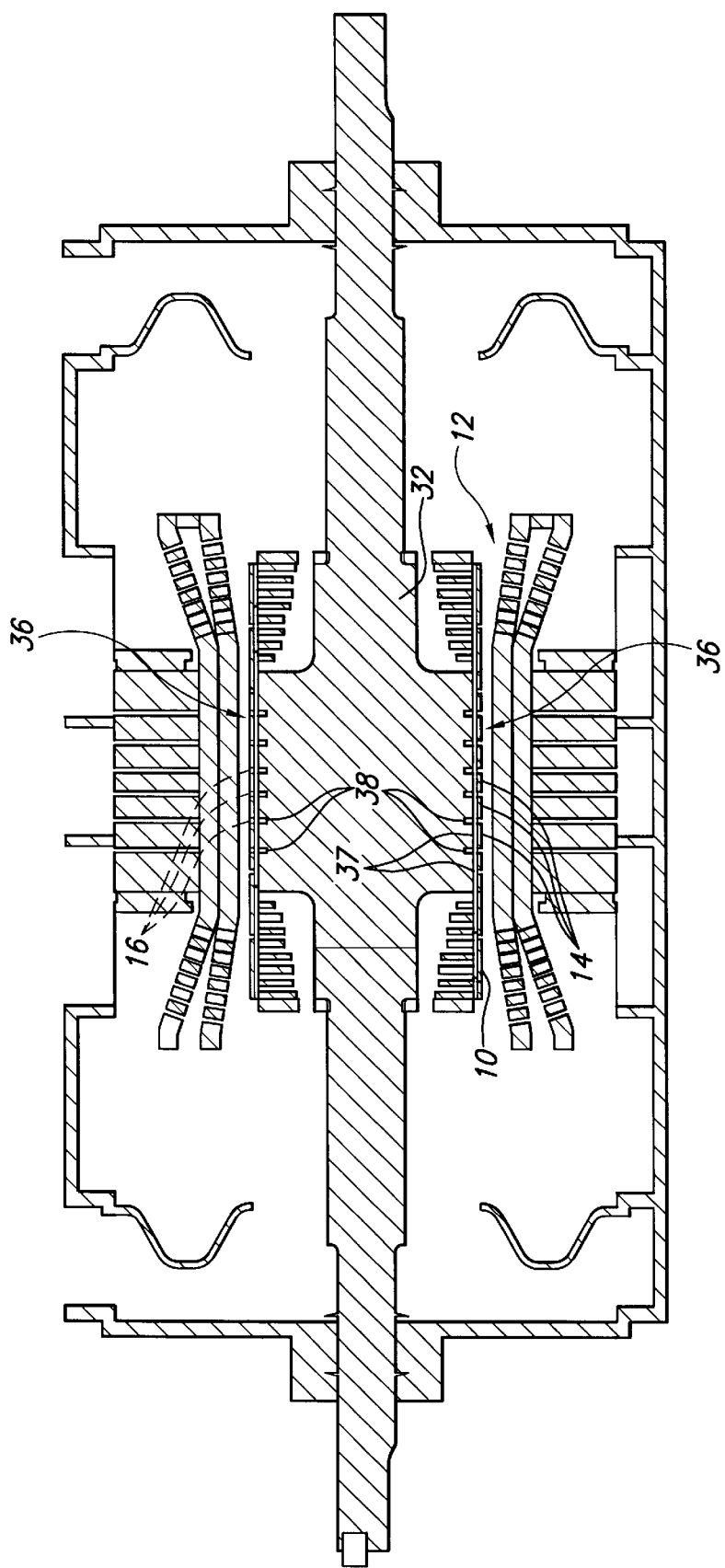
FIG. 4 is a cross-sectional view of a generator including the enclosure of the present invention.

FIG. 3 is a schematic illustration of an assembled generator stator and rotor. As shown, the rotor assembly 30 is housed within the enclosure 10, and the gap 12 is shown between the stator and rotor. The enclosure 10 is preferably formed of a non-circular shape, such as a substantially oval shape as shown. The larger diameter of the oval shape is configured along the d-axis, with the smaller diameter configured along the q-axis. With this construction, the non-magnetic gap 12 is minimized at the d-axis, while maximizing the air gap along the q-axis. The non-circular shape facilitates clearance of the enclosure 10 over the rotor pole faces 36.

During operation, centrifugal loading of the winding against the enclosure 10 causes portions of the enclosure 10 to bear down on each pole face 36, thereby creating a higher degree of locking behavior with increasing speed. In contrast, with shrunk-on rings in conventional rotors, a reduction in locking behavior is exhibited with increasing speed.

With the structure according to the invention, the field winding is restrained against centrifugal forces without constraining rotor body crossslots from correcting peripheral dissymmetries in rotor stiffness. Additionally, as noted, the structure provides openings for ventilation without introducing stress concentrations in the enclosure. Moreover, the rotor assembly is simplified, and the risk of local damage to individual pieces is isolated as opposed to requiring replacement of the entire containment structure.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An enclosure for a rotor in a generator including the rotor, rotor windings and a stator and without rotor wedges, rotor teeth and retaining rings, the enclosure comprising a non-metallic tube that is sized to entirely contain the rotor windings.

2. An enclosure for a rotor according to claim 1, wherein the non-metallic tube is formed of a plurality of rings.

3. An enclosure for a rotor according to claim 2, wherein the rings are spaced at predetermined intervals.

4. An enclosure for a rotor according to claim 3, wherein the rings are spaced axially such that cross slots in the rotor lie between the rings.

5. A rotor according to claim 4, wherein the cross slots located between rings provide corrections to dissymmetry in rotor stiffness around a periphery of the rotor.

6. A rotor according to claim 3, wherein the spaces between adjacent rings provide discharge openings for winding ventilation without introducing stress concentrations in the enclosure.

7. An enclosure for a rotor according to claim 1, wherein the non-metallic tube is formed of a low density composite material.

8. An enclosure for a rotor according to claim 7, wherein the low density composite material is a carbon fiber—glass fiber epoxy composite.

9. An enclosure for a rotor according to claim 1, wherein the non-metallic tube is formed of a continuous tube, and wherein a plurality of ventilation holes are formed in the continuous tube, the ventilation holes providing winding ventilation away from the rotor.

10. A rotor in a generator comprising:

a magnetic core having at least two poles;

a plurality of winding assemblies, one for each pole; and an enclosure entirely housing and retaining the core and the winding assemblies without rotor wedges, rotor teeth and retaining rings, wherein the enclosure comprises a non-metallic tube.

11. A rotor according to claim 10, wherein the non-metallic tube is formed of a plurality of rings.

12. A rotor according to claim 11, wherein the rings are spaced at predetermined intervals.

13. A rotor according to claim 10, wherein the non-metallic tube is formed of a low density composite material.

14. A rotor according to claim 13, wherein the low density composite material is a carbon fiber—glass fiber epoxy composite.

15. A rotor according to claim 10, wherein the non-metallic tube is formed of a continuous tube, and wherein a plurality of ventilation holes are formed in the continuous tube, the ventilation holes providing winding ventilation away from the rotor.

* * * * *